United States Patent [19]
Huang et al.

[11] Patent Number: 5,117,304
[45] Date of Patent: May 26, 1992

[54] RETROREFLECTIVE ARTICLE

[75] Inventors: Tzu-Li J. Huang, Woodbury; Walton J. Hammar, St. Paul; James C. Coderre, Lake Elmo; Mirian D. Nave, St. Paul, all of Minn.

[73] Assignee: Minnesota Mining and Manufacturing Company, St. Paul, Minn.

[21] Appl. No.: 586,005

[22] Filed: Sep. 21, 1990

[51] Int. Cl.⁵ .............................. G02B 5/122
[52] U.S. Cl. ...................... 359/529; 359/530
[58] Field of Search ............ 350/102, 103; 428/156, 428/159, 245; 528/28

[56] References Cited

U.S. PATENT DOCUMENTS

| | | | |
|---|---|---|---|
| 3,684,348 | 8/1972 | Rowland | 359/530 |
| 3,689,346 | 9/1972 | Rowland | 156/245 |
| 4,576,850 | 3/1986 | Martens | 428/156 |
| 4,582,885 | 4/1986 | Barber | 528/28 |
| 4,588,258 | 5/1986 | Hoopman | 359/530 |
| 4,668,558 | 5/1987 | Barber | 428/156 |
| 4,895,428 | 1/1990 | Nelson et al. | 359/530 |

OTHER PUBLICATIONS

Gorman et al., Rubber and Plastic News, p. 32 (Apr. 26, 1986).
Syed, Rubber and Plastic News, pp. 21–22 (Mar. 21, 1988).
Dieter et al., Polymer Engineering and Science, vol. 27, No. 9, pp. 673–683 (Mid–May 1987).

*Primary Examiner*—Loha Ben
*Attorney, Agent, or Firm*—Gary L. Griswold; Walter N. Kirn; David B. Kagan

[57] ABSTRACT

The present invention provides improved, flexible retroreflective articles based upon an optically clear, aliphatic polyurethane polymer. The aliphatic polymer has a plurality of hard chain segments of the formula 27 Claims, 3 Drawing Sheets

RETROREFLECTIVE ARTICLE

FIELD OF THE INVENTION

This invention relates to improved retroreflective articles, such as cube-corner retroreflective sheeting, and to a process for making such articles.

BACKGROUND OF THE INVENTION

Retroreflective articles are used extensively for making highway signs, street signs, pavement markings, and the like. In particular, retroreflective articles comprising an array of cube corner retroreflective elements are now well known in the art. Cube corner retroreflective elements are prism structures which have three mutually perpendicular faces meeting at a single corner, such as that configuration defined by the corner of a room or a cube. Cube corner elements operate according to the principle of total internal reflection. That is, a cube corner element receives a ray of incident light from a source and sends it back toward the same source in a direction substantially parallel to the ray of incident light.

Rigid retroreflective articles have been formed from materials including polymethylmethacrylate, polycarbonates, polyethylene terephthalate, and the like. Because such articles are rigid, however, they are difficult to apply to irregular surfaces, e.g., curved surfaces or surfaces with corrugations or rivets. Flexible retroreflective articles would be desirable for imparting retroreflectivity to such irregular surfaces. For example, flexible retroreflective articles could be advantageously used for applications such as vehicle conspicuity, boat and shipping conspicuity, roll-up sign products, personal safety products, internal reflectance for energy control, and the like. Desirable properties for such flexible retroreflective articles would include not only flexibility, but also excellent resistance to weathering; dimensional stability in hot and cold temperatures; flexibility over a wide range of temperatures; and good optical clarity relative to the visible light wavelengths.

Flexible retroreflective articles have been formed with materials such as plasticized polyvinyl chloride. These materials, however, show poor dimensional stability at elevated temperatures. Additionally, the plasticizer used in these materials tends to migrate to the surface, causing discoloration and impairment of retroreflective efficiency.

Relatively thin retroreflective articles having some degree of flexibility have also been formed using thin caliper, high modulus resins such as polycarbonate, polyester, or acrylic resins. Such articles can be coated with an aluminum vapor coat. These articles, however, tend to wrinkle when applied to surfaces having rivets or corrugations.

Attempts have also been made to prepare flexible, dimensionally stable retroreflective articles based on polyurethane polymers. For example, U.S. Pat. No. 4,576,850 discloses a retroreflective article based on a radiation curable aliphatic urethane oligomer. These articles, however, show low tear strength.

U.S. Pat. Nos. 4,582,885 and 4,668,558 disclose retroreflective articles based on acrylate end-capped siloxane urethane oligomers. These articles, too, show low tear strength.

An aliphatic polyurethane obtained by reacting 1,4-cyclohexane diisocyanate, a polydiol, and butane diol has been described, for example, in Gorman et al., Rubber and Plastic News, p. 32 (Apr. 26, 1986); Syed, Rubber and Plastic News, pp. 21–22 (Mar. 21, 1988); and Dieter et al., Polymer Engineering and Science, Vol. 27, No. 9, pp. 673–83 (Mid-May 1987).

SUMMARY OF THE INVENTION

The present invention provides improved, flexible retroreflective articles based upon an optically clear, aliphatic polyurethane. The flexible retroreflective articles of the present invention are characterized by improved thermal dimensional stability at elevated temperatures; very good retained retroreflective brightness over extended periods of time; and flexibility and conformability over a wide range of application temperatures.

The retroreflective articles of the present invention are generally useful for imparting retroreflectivity in various applications such as traffic signs, pavement markings, construction zone markings, and the like, but are especially useful for imparting retroreflectivity to irregular surfaces. As a result, the inventive retroreflective articles may be advantageously used for applications such as vehicle conspicuity, boating and shipping conspicuity, roll-up sign products, personal safety products, internal reflectance for energy control, and the like.

The advantages of the present invention are achieved by a retroreflective article comprising a land and an array of retroreflective elements on the land. The retroreflective elements comprise an optically clear, flexible, aliphatic polyurethane polymer having a plurality of hard chain segments of the formula

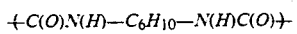

which are incorporated into the polyurethane polymer.

The retroreflective articles of the present invention can be prepared with a wide variety of desired properties, such as toughness, flexibility, optical clarity, weatherability, and dimensional stability. For example, preferred embodiments of the invention may be prepared with a tensile modulus at 5% elongation of from about $6.0 \times 10^3$ psi (40 MPa) to about $1.5 \times 10^4$ psi (100 MPa) and an elongation at break of from about 300 to about 600 percent. These properties can be varied by proper selection of the polymeric composition.

The term "optically clear" means that the polyurethane shows at least 80%, and more preferably at least 90%, transmission of visible light at wavelengths of from 400 nm to 900 nm as measured by an IBM Model 9420 UV-Visible Spectrometer.

DESCRIPTION OF THE PREFERRED EMBODIMENTS

Figure 1:
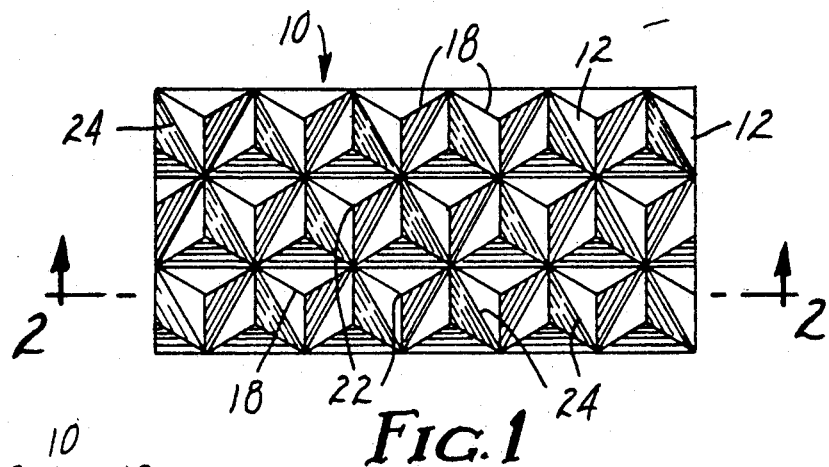
FIG. 1 is a plan view of an array of retroreflective elements of the present invention.
Figure 2A:
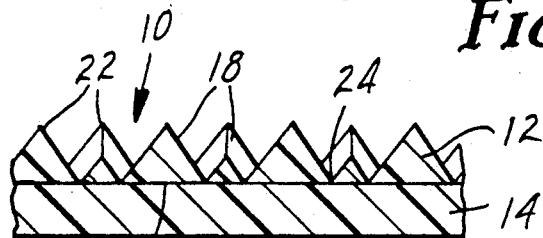
FIG. 2a is an elevation section of FIG. 1 taken along line 2—2.

FIGS. 1 and 2a schematically show one embodiment of a retroreflective article 10 made in accordance with the present invention. An array of retroreflective elements 12 are carried on one side of a land 14. The other side of the land 14 generally has a smooth, planar surface 16. The land 14 is sufficiently thick such that the retroreflective article 10 is self-supporting and such that the dimensional integrity of the retroreflective elements 12 is maintained. Typically, the land 14 will have a thickness of from about 0.05 mm to about 1.0 mm, and preferably from about 0.10 mm to about 0.30 mm.

Useful materials for forming the land 14 include materials which are dimensionally stable, durable, weatherable, and readily formable into the desired configuration. Examples of suitable materials include acrylics (such as Plexiglass resin commercially available from Rohm and Haas), which generally have an index of refraction of about 1.5; polycarbonates, which have an index of refraction of about 1.6; reactive materials as described in United Kingdom Pat. No. 2,027,441; polyethylene-based ionomers (marketed under the tradename "SURLYN"); polyesters; and cellulose acetate butyrates. A preferred material for forming the land 14 is the novel polyurethane polymer of the present invention, which is described in more detail below. The land 14 may optionally include ultraviolet light absorbers, antioxidants, and the like, as needed.

The retroreflective elements 12 may be formed using a variety of geometries and configurations. As one example, FIGS. 1 and 2 show retroreflective elements 12 having a cube-corner configuration. Other geometries and configurations are described, for example, in U.S. Pat. Nos. 4,588,258 and 4,895,428.

As shown in FIGS. 1 and 2a, each cube-corner retroreflective element 12 preferably has the shape of a prism with three exposed, planar faces 18 and a base 20. The apex 22 of each element 12 is vertically aligned with the center of the base 20. The angle between each of the planar faces 18 is about 90° and is the same for each retroreflective element 12 in the array. As well known in the art, this angle can deviate slightly from 90° by design depending upon the particular application.

The retroreflective elements 12 generally all have the same dimensions and are aligned in an array of rows and columns. Preferably, the bases 20 of the elements 12 are in the same plane, and adjacent elements 12 are contiguous at the edges 24 of their bases 20 such that there is no spacing between adjacent elements 12. The retroreflective article would still be operable if the elements 12 were not contiguous, but the effective area of retroreflectivity would be decreased. As the effective area of retroreflection is decreased, the retroreflective articles would show a decreased retroreflective efficiency. Generally, each element has a height (base to apex) of from about 0.02 mm to about 0.50 mm, and more preferably from about 0.02 mm to 0.25 mm.

Figure 2B:
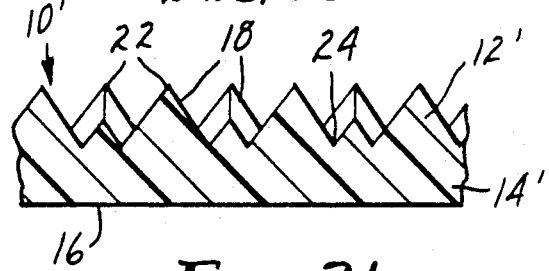
FIG. 2b is an alternative elevation section of FIG. 1 taken along line 2—2.

As shown in FIG. 2a, the retroreflecting article 10 may be formed as a layered product in which the plurality of retroreflecting elements 12 are attached to the land 14 at their bases 20 as taught in U.S. Pat. No. 3,684,348. As shown in FIG. 2b, however, a retroreflective article 10' of the present invention may also be formed as a monolithic structure in which retroreflective elements 12' and a land 14' form an integral body.

Figure 3:
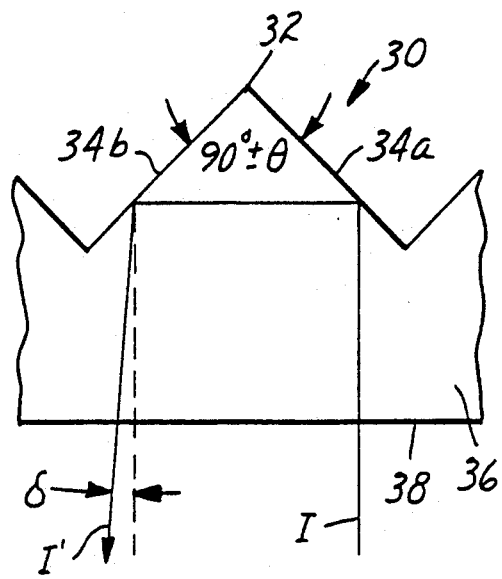
FIG. 3 is a schematic view of a cube corner retroreflective element.

The principle of operation of retroreflective elements is well known and is described, for example, in J. Optical Society of America, Vol. 48, No. 7, Jul. 1958, p. 496. This principle is illustrated in FIG. 3. FIG. 3 is a two-dimensional schematic illustration of a retroreflective article 30 having a single cube corner retroreflective element 32. The cube corner element 32 has two planar faces 34a and 34b being substantially perpendicular to one another, as shown by the apex angle 90° ±Θ. Ideally, the angle Θ has a measure of 0° so that the apex angle is exactly 90°. However, in practice, Θ is generally greater than 0°. Even so, it is desirable to form cube-corner elements in which the angle Θ is as small as possible. The cube corner element 32 is carried on a land 36 having an exposed lower surface 38.

An incident ray of light I enters the retroreflective article 30 upon perpendicularly striking the exposed lower surface 38. The ray of light I passes through the land 36, strikes one face 34a, is reflected to the other face 34b, is reflected from the face 34b, and passes out of the element 32 as ray of light I' Perfect retroreflection would result in the ray of light I' passing out of the element 32 in a path, shown by the broken line, exactly parallel to the incident ray of light I. The deviation between the path of perfect retroreflection and the actual path I' is shown by the divergence angle, δ.

In order to obtain and maintain the desired divergence angle, δ, the retroreflective element 32 must be characterized by excellent dimensional stability. That is, the dimensions and angles of the cube corner element 32 must be maintained within very narrow limits. For example, as described by J. Optical Society of America, supra, for a material having an index of refraction of 1.5, the divergence angle, δ, is given by the expression $\delta = 4.9\,\Theta$. Thus, when δ is only 0.2°, Θ is 0.041° or 2.46 minutes of arc, which is an exceedingly small angle. Thus, if the angle Θ is or becomes too large, e.g., because of shrinkage, distortion upon removal from the mold, or thermal distortion, then the efficiency of retroreflection will be impaired. Practical tests have shown that preferred embodiments of the present invention show a retained retroreflectivity of at least 90% even after being thermally aged at 180° F. (82° C.) over extended periods of time. This high degree of retained retroreflectivity shows that the present invention has excellent dimensional stability.

Figure 4:
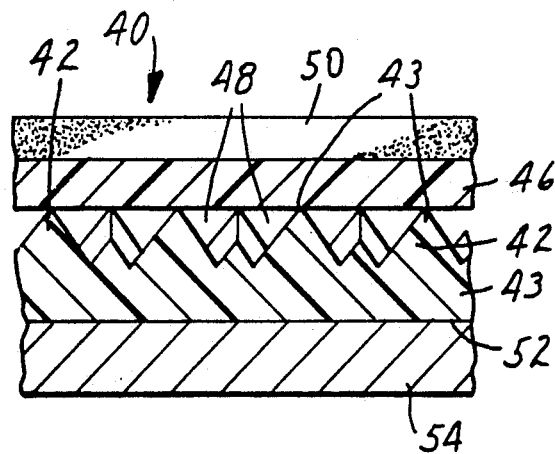
FIG. 4 is a side elevation section of an alternative embodiment of this invention employing a backing layer.

In FIG. 4, an alternative embodiment of the present invention is shown. This embodiment is particularly useful in those applications, e.g., traffic control marking applications, for which it may be desirable to seal the air spaces between the planar faces of the retroreflecting elements. A retroreflective article 40 comprises an array of retroreflective elements 42 carried on a land 44. A backing layer 46 is applied to the apices 43 of the retroreflecting elements 42, thus sealing the air spaces 48, as described in U.S. Pat. No. 4,025,159. Generally, the backing layer 46 may be made from any transparent or opaque material which can be sealed with the retroreflecting elements. Examples of suitable materials for the backing layer 46 include polymeric materials such as polymethyl methacrylates, polyesters, polyamides, polyvinyl fluorides, polycarbonates, polyvinyl chlorides, and the like. Optionally, the backing layer 46 carries an adhesive layer 50, which is used to attach the retroreflective article 40 to a signing material. The exposed lower surface 52 of the land 44 may be selectively coated with transparent ink layers (not shown) to provide the desired traffic control message, e.g., "STOP". Preferably, a protective top layer 54 may be applied to the exposed lower surface 52 of the land 44 in order to protect the message.

The retroreflective elements of the present invention comprise a flexible, optically clear, aliphatic polyurethane polymer having a first plurality of hard chain segments of the formula $$-C(O)N(H)-C_6H_{10}-N(H)C(O)-$$

which are incorporated into the polyurethane polymer. Preferably, the polymer comprises from about 2 to about 20 weight percent of these segments.

For preferred polyurethane polymers of the present invention, the first plurality of hard segments may be derived from trans 1,4-cyclohexane diisocyanate ("CHDI"). CHDI is a highly compact, symmetrical diisocyanate having the formula $$OCN-C_6H_{10}-NCO$$

CHDI is fully described in Gorman et al., Rubber and Plastic News, p. 32 (Apr. 26, 1986); Syed, Rubber and Plastic News, pp. 21-22 (Mar. 21, 1988); and Dieter et al., Polymer Engineering and Science, Vol. 27, No. 9, pp. 673-83 (Mid-May 1987).

The first plurality of hard segments may also be derived from pre-formed, difunctional oligomers endcapped with groups having the formula $$OCN-C_6H_{10}-N(H)C(O)-.$$

Generally, such oligomers are obtained by reacting CHDI with a suitable, aliphatic polydiol. Such oligomers shall be referred to herein as "CHDI oligomers". The CHDI components of such oligomers are precursors to hard chain segments of the resulting polyurethane polymer, and the polydiol components of such oligomers are precursors to soft chain segments of the resulting polyurethane polymer. Such soft chain segments are described in more detail below. Representative examples of commercially available CHDI oligomers include Elate NTR-103, Elate NTR-104, and Elate NTR-108, all of which are available from Akzo Chemical Co. Elate NTR-103 is a CHDI oligomer of CHDI and a hydroxy-terminated poly(tetramethylene oxide) ("PTMO") and has an NCO content of 6.9 percent. Elate NTR-104 and Elate NTR-108 are CHDI oligomers obtained by reacting CHDI with a polycaprolactone diol. Elate NTR-104 has an NCO content of 5.7 percent, and Elate NTR-108 has an NCO content of 4.0 percent.

Preferred polyurethane polymers of the present invention also comprise a plurality of soft chain segments having the formula $$-ORO-,$$

wherein R is a divalent, aliphatic group which may be a substituted or unsubstituted cyclic, acyclic, or branched aliphatic moiety. Optionally, R may contain catenary oxygen atoms, sulfur atoms, trisubstituted nitrogen atoms, ester linkages, and the like. The soft chain segments preferably have a molecular weight of from about 400 to about 5000 and preferably comprise from about 30 to about 90 percent by weight of the polyurethane polymer. If the soft segments comprise less than about 30 percent by weight of the polyurethane polymer, then the polyurethane polymer may not have enough flexibility for those applications in which the retroreflective articles of the invention are applied to irregular surfaces. On the other hand, if too much of the soft segment is used, then the retroreflective articles of the invention may lack sufficient durability and dimensional stability.

For preferred polyurethane polymers of the present invention, the soft chain segments may be derived from a suitable polydiol. Examples of suitable polydiols include polyester diols, polycaprolactone diols, polycarbonate diols, polydimethylsiloxane diols, polyether diols, polyolefin diols, and the like.

Representative polyester diols include polyester diols prepared by the polymerization of an aliphatic dicarboxylic acid or anhydride with a glycol. Examples of aliphatic dicarboxylic acids include, for example, adipic acid, succinic acid, pimelic acid, suberic acid, azelaic acid, sebacic acid, and the like or their anhydrides. The phthalic acids and their anhydrides are also useful in the practice of the present invention. The glycols used in the preparation of the polyesters include aliphatic diols containing between 2 and 10 carbon atoms, usually 2 to 6 carbon atoms, such as ethylene glycol, propylene glycol, butane diol, hexamethylene diol, decamethylene diol, 2-ethylhexane diol, 1,6-neopentyl diol, and the like. Representative polyester diols may also include polycaprolactone diols.

Representative polyether diols, also referred to as poly(alkylene oxides), are essentially hydroxyl containing compounds having ether linkages. Examples of polyether diols include hydroxyl-terminated poly(propylene oxide), hydroxyl-terminated poly(tetramethylene oxide), hydroxyl-terminated poly(pentamethylene oxide), hydroxyl-terminated poly(hexamethylene oxide), hydroxyl-terminated poly(ethylene oxide), hydroxyl-terminated poly(1,2-propylene oxide), hydroxyl-terminated poly(1,2-butylene oxide), tetrahydrofuran, ethylene oxide copolyethers, and the like.

A particularly useful class of polydiols is the class of hydroxyl-terminated poly(tetramethylene oxide) diols (hereinafter referred to as "PTMO diols") commercially available under the tradename Terathane from E. I. du Pont de Nemours & Co., Inc. These polydiols have molecular weights ranging from about 600 to about 3000 and may be represented by the formula:

$$H-(-OCH_2CH_2CH_2CH_2-)_x-OH.$$

Another particularly useful polydiol is a polycaprolactone diol commercially available as Tone 0221 from Union Carbide Company.

Optionally, preferred polyurethane polymers of the present invention may also comprise a second plurality of hard chain segments having the formula $$-C(O)N(H)-R'-N(H)C(O)-$$

incorporated into the polyurethane polymer. In this formula R' is a divalent, aliphatic group which may be a substituted or unsubstituted cyclic, acyclic, or branched aliphatic moiety. Optionally, R' may contain catenary oxygen atoms, sulfur atoms, trisubstituted nitrogen atoms, ester linkages, and the like.

For preferred polyurethane polymers of the present invention, the second plurality of hard chain segments may be derived from an aliphatic diisocyanate. Representative examples of the second diisocyanate include methylene bis-(4-cyclohexyl-isocyanate); hexamethylene diisocyanate; isophorone diisocyanate; 1,6-diisocyanato-2,2,4,4,-tetramethylhexane; 1,6,-diisocyanato-2,4,4,-trimethylhexane; and

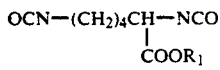

wherein $R_1$ is $-CH_3$ OR $-C_2H_5$. Of these materials, a particularly preferred diisocyanate is methylene bis-(4-cyclohexyl-isocyanate). This compound has the formula $$OCN-C_6H_{10}-CH_2-C_6H_{10}-NCO$$

and is commercially available as Desmodur W from Mobay Chemical Corporation.

Optionally, preferred polyurethane polymers of the present invention may also comprise a plurality of chain extender segments incorporated into the polyurethane polymer. Preferred chain extender segments have the formula

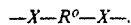

wherein $R^o$ is a divalent, aliphatic moiety, and X may independently be oxygen, sulfur, NH, C(O)O, or the like. The chain extender segments preferably have a molecular weight of about 400 or less. The chain extender segments of the present invention may be derived from the known hydroxy, carboxy, amino, or mercapto terminated compounds known to be useful as chain extenders. Such compounds are described, for example, in U.S. Pat. No. 3,448,171. Preferred chain extenders include the various short chain diols which have a molecular weight of less than about 400 and which are represented by the formula

wherein $R_2$ is any divalent, aliphatic group having from about 2 to about 20 carbon atoms. Typically, $R_2$ is a substituted or unsubstituted cyclic, acyclic, or branched aliphatic moiety. Examples of such diols include ethylene diol, propylene diol, 1,6-hexane diol, 2-ethylhexanediol, 2,2-dimethyl-1,3-propanediol, 1,4-butanediol, 2-butene-1,4-diol, diethylene glycol, and the like. Cycloaliphatic glycols such as cyclohexanedimethanol may also be used.

Preferably, the aliphatic polyurethane polymers of the present invention have a weight average molecular weight, $M<w>$, of at least 100,000, and more preferably of from about 120,000 to about 320,000. It is also preferred that the aliphatic polyurethane polymers of the present invention have a number average molecular weight, $M<n>$, of at least 60,000, and more preferably from about 60,000 to about 160,000. If $M<w>$ and/or $M<n>$ are too low, then the polyurethane may tend to have poor tensile properties. If $M<w>$ and/or $M<n>$ are too high, then the polyurethane polymer may be more difficult to process, e.g., more difficult to extrude in the form of an optically clear film.

Suitable additives, e.g., ultraviolet light stabilizers, antioxidants, and mold releasing agents, may also be used in preparing the polyurethane polymers of the present invention. The usage of such additives is described, for example, in Ulrich, "Polyurethane Stabilizers", J. of Elastomers and Plastics, vol. 18 (No. 3), pp. 147-158 (Jul. 1986); and Gabriele et al., "The Effects of Hostile Environment on Coating and Plastics", ACS Sym. Ser 229, pp. 317-330 (1983).

The polyurethane polymer useful in the practice of the present invention can be prepared by a variety of general reactions. For example, one preferred polyurethane polymer of the present invention may be prepared by reacting substantially equimolar amounts of a CHDI oligomer and a polydiol. In this embodiment, the soft chain segments are derived from the polydiol and the polydiol components of the CHDI oligomer. The hard chain segments are derived from the CHDI components of the CHDI oligomer. The various physical properties of this preferred polyurethane polymer, e.g., flexibility, dimensional stability, and the like, can be adjusted as desired by choosing soft segment precursors with relatively high or low molecular weights. A preferred polyurethane polymer with an excellent balance of physical properties may be prepared by reacting substantially equimolar amounts of Elate NTR-103 (CHDI oligomer) with Terathane 1000 (polydiol).

Another preferred polyurethane polymer of the present invention may be prepared by reacting a CHDI oligomer, optionally a diisocyanate, a polydiol, and a chain extender. Preferably, these materials are used in sufficient amounts such that the polyurethane polymer comprises:

m units of chain segments having the formula $-C(O)N(H)-C_6H_{10}-N(H)C(O)-$;

n units of chain segments having the formula $-C(O)N(H)-R'-N(H)C(O)-$;

p units of chain segments having the formula $-OR_O-$; and q units of chain segments having the formula $-OR_2O-$; wherein:

the ratio of m to (m+n) is from about 0.05 to about 1.00, and preferably from about 0.10 to about 0.40; and the ratio of (m+n) to (p+q) is substantially 1.0 +/−0.05.

The ratio of p to q is not critical. Preferably, however, the ratio of p to q is large enough such that the polydiol is present in a sufficient amount such that the polyurethane polymer comprises from about 30 to about 90 percent by weight of the polydiol.

A particularly preferred method of making the polyurethane polymers of the present invention involves bulk polymerization of the reactants in a twin-screw extruder. In general, the twin screw extrusion is performed by providing the isocyanate functional compounds in a first vessel. A mixture of the hydroxy functional compounds, the chain extender, if any, plus any desired additives are provided in a second vessel. The contents of the two vessels are then pumped to the inlet end of the extruder. The twin screw extruder used should have a relatively close clearance between the screw flight lands and the barrel, typical values being in the range of from 0.25 to 0.5 mm. The extruder can be either a co-rotating or a counter-rotating twin screw apparatus. The extruder has been found to be such a good mixer that it is not necessary to make a premix of the raw materials fed to the extruder or to use kneading elements in the extruder.

One twin screw extruding apparatus found to be particularly useful in the practice of the present invention is a 34 mm diameter, counter-rotating twin screw extruder made by Leistritz GmBH of Nurenberg, West Germany. This particular apparatus has a length to diameter ratio of 35. The extruder screws of this apparatus comprise a number of separate sections which fit onto a common driveshaft. The screws can be disassembled and rearranged in various orders and orientations. The screws may have one pitch at the inlet section, another pitch in the middle of the extruder, and another pitch toward the exit of the extruder. Additionally, the barrel is divided into sections, each of which can be either a heating section, or a cooling section. Since the extruder has several addition ports along its length, additional materials may be added at several points along the reaction path. In this way, very sensitive reactants, colorants, lubricants, or the like could be added closer to the exit of the extruder. Residence time in the twin screw extruder may be controlled by changing the geometry of the screws, the chemistry of the reaction itself, the temperatures at which the various extruder barrels are maintained, and the rotational speed of the extruder screws.

After emerging from the extruder, the extrudate is pumped to a quench bath. A positive displacement pump, such as a Zenith die pump, may be used to convey the extrudate to the quench bath. The quench bath may comprise a long rectangular tank containing water or another suitable cooling fluid, such as an inert, non-polar, high-boiling organic liquid. The cooled polymer is then dried, for example, by using an air stream or by passing the reaction product over paper towels. The dried polymer may then be reduced to a convenient form. For example, the polymer may be pelletized in a pelletizer and then further extruded in a single screw extruder to provide a polymer sheet suitable for making retroreflective articles. Alternatively, the polymer may be extruded directly in sheet form suitable for making retroreflective articles.

Generally, the various polyurethane-forming reactions are carried out at a temperature of from about 120° C. to about 200° C. for a reaction time of from about ten minutes to several hours. Optionally, a catalyst may be used to promote these reactions. Typical examples of such catalysts include compounds containing tertiary amino groups, tin compounds, and titanium compounds. Preferred catalysts include dibutyltin dilaurate, dibutyltin diethylhexoate, dibutyltin sulfide, dibutyltin dibutoxide, stannous octoate, stannous oleate, and stannous chloride. Concentrations of catalyst of from about 0.01 to about 0.5 percent, and preferably from about 0.025 to about 0.1 percent by weight of catalyst based on the total weight of reactants can be used.

The retroreflecting articles of the invention may be formed in a variety of ways. For example, the inventive retroreflective articles may be formed as a layered product in which a plurality of retroreflecting elements are attached at their bases to a land as taught in U.S. Pat. No. 3,684,348. With this approach, the land may be formed from a material that is the same as, or different from, the novel polyurethane of the present invention that is used to form the retroreflecting elements.

More preferably, the retroreflective articles of the present invention are formed by embossing a preformed polyurethane film of the present invention with a described array of retroreflective elements. With this approach the retroreflective elements and the land are integral, thus forming a monolithic body.

One particularly useful manufacturing technique for embossing a preformed polyurethane film of the present invention involves making a master mold by cutting three intersecting sets of parallel V-shaped grooves into a suitable plate, such as an acrylic plate, using a diamond-tipped tool. The grooves are positioned so as to provide an array of cube corner elements on the cut surface of the plate. Next, an electroform is made from the grooved plate by electrolytic deposition of a suitable mold-forming metal, such as nickel. To form a retroreflective article of the present invention, the electroform is then pressed against a pre-formed polyurethane film. The pattern of retroreflecting elements on the electroform is thus embossed onto the film. By controlling the depth of the embossing, the surface of the polyurethane film which does not receive the mold impression then becomes the smooth surface of the land of the resulting retroreflective article.

To make it easier to remove the embossed article from the electroform, it is preferred to use a mold releasing agent in the preparation of the polyurethane polymer of the present invention. Representative examples of mold releasing agents include fatty acid esters such as Loxil G-715 or Loxil G-40 available from Henkel Corporation, or Wax E available from Hoechst Celanese Corporation. Other mold releasing agents are described, for example, in U.S. Pat. Nos. 4,766,172; 4,609,682; 4,594,402; and 4,609,511. Typically, the mold releasing agent is used in an amount of from about 0.5 weight percent to about 2.0 weight percent based on the total weight of the reactants used in preparing the polyurethane.

The invention will be further described with reference to the following examples. In the examples, the following raw materials were used:

Elate NTR-103 is an oligomer of 1,4-cyclohexane diisocyanate and polytetramethylene glycol. Elate NTR-104 and Elate-108 are oligomers of 1,4-cyclohexane diisocyanate and polycaprolactone glycol. Each of these oligomers is available from the Akzo Chemical Company, Inc., Chicago, Ill.

Desmodur W is 4,4'-diisocyanatedicyclohexylmethane, available from Mobay Corporation, Pittsburgh, Pa.

Terathane-1000 is a hydroxy-terminated polytetramethylene glycol having a molecular weight of about 1000 g/mol and is available from E. I. du Pont de Nemours & Co., Wilmington, Del.

Tone Polyol-0221 is a hydroxy-terminated polycaprolactone glycol having a molecular weight of about 1000 g/mol and is available from Union Carbide, Danbury, Conn.

1,4-Butane diol is a chain extender available from GAF Corporation, Wayne, N.J.

Uvinul N-35 is ethyl-2-cyano-3,3-diphenylacrylate, and Uvinul N-539 is 2-ethylhexyl-2-cyano-3,3-diphenylacrylate. Both Uvinul N-35 and Uvinul N-539 are ultraviolet light absorbers and are available from BASF Wyandotte Corp., Parsippany, N.J.

Tinuvin-328 is 2-(2'-hydroxy-3',5'-di-tert-amylphenyl)-benzotriazole, an ultraviolet light absorber available from Ciba Geigy Corporation, Plastics and Additives Division, Hawthorne, N.Y.

Tinuvin-770 is bis-(2,2,6,6-tetramethyl-4-piperidyl)-sebacate, a free radical scavenger available from Ciba Geigy Corporation, Plastics and Additives Division, Hawthorne, N.Y.

Wax E is a mold releasing agent based upon a montan wax acid ester mixture and is available from Hoechst Celanese Corporation, Somerville, N.J.

Irganox-1010 is tetra-(methylene-(3',5'-di-tert-butyl-4'-hydroxyphenyl)-propionate)-methane, an antioxidant available from Ciba Geigy Corporation, Plastics and Additives Division, Hawthorne, N.Y.

DBTDL is dibutyl tin dilaurate, a catalyst available from M & T Chemicals, Rahway, N.J.

EXAMPLE 1

Aliphatic polyurethane samples (Samples 1, 2, 3, 4, and 5) of the present invention were prepared using a batch method from the following ingredients in the following amounts:

TABLE I*

| | Sample | | | | |
|---|---|---|---|---|---|
| | 1 | 2 | 3 | 4 | 5 |
| Elate NTR-103 | 37.55 | 28.16 | — | — | 22.40 |
| Elate NTR-104 | — | — | 37.66 | — | — |
| Elate NTR-108 | — | — | — | 130.83 | — |
| Desmodur W | 30.44 | 36.68 | 26.45 | 48.90 | 0.00 |
| 1,4-Butane-diol | 11.02 | 11.05 | 8.89 | 22.41 | — |
| Terathane-1000 | 21.00 | 24.50 | — | — | 16.56 |
| Tone Polyol-0221 | — | — | 27.00 | — | — |
| Uvinul N-35 | 0.75 | 0.75 | 0.75 | — | — |
| Tinuvin-328 | — | — | — | 1.50 | — |
| Tinuvin-770 | 0.35 | 0.35 | 0.35 | 1.50 | — |
| Wax E | 0.75 | 0.75 | 0.75 | — | — |
| Irganox 1010 | 0.05 | 0.05 | 0.05 | — | — |
| DBTDL | 5 drops | 5 drops | 5 drops | 5 drops | 5 drops |

*All amounts are expressed in grams unless otherwise noted.

All ingredients, except the reaction catalyst, were first charged to a 500 ml glass container. The glass container was sealed to prevent moisture from getting in and then placed on a steam bath. While heating, the contents of the glass container were thoroughly mixed. After a homogeneous mixture was obtained, it was removed from the steam bath and 5 drops of dibutyltin dilaurate ("DBTLD") catalyst were added with a quick stirring. Stirring was continued until the reaction exothermed noticeably and the mixture became more viscous. After this, the mixture was poured into a teflon lined shallow aluminum pan and placed in a 100° C. oven and cured for about one hour. An aliphatic polyurethane product was thereby obtained.

EXAMPLE 2

Aliphatic polyurethane samples of the present invention (Samples 6, 7, 8, 9, 10, 11, and 12) and a comparison sample (Sample A) were made using a twin screw extruder from the following ingredients in the following amounts:

TABLE II*

| | Sample | | | | | | | |
|---|---|---|---|---|---|---|---|---|
| | 6 | 7 | 8 | 9 | 10 | 11 | 12 | — |
| | | | | | | | | Comparison Sample |
| | — | — | — | — | — | — | — | A |
| Elate NTR-103 | 0 | 0 | 18.12 | 18.12 | 27.21 | 0 | 36.72 | 0 |
| Elate NTR-104 | 36.94 | 40.28 | 0 | 0 | 0 | 27.49 | 0 | 0 |
| Desmodur-W | 25.84 | 28.03 | 39.46 | 39.46 | 34.53 | 34.53 | 30.48 | 42.72 |
| 1,4-Butane-diol | 8.83 | 10.42 | 12.49 | 12.49 | 11.74 | 11.46 | 11.56 | 10.80 |
| Terathane 1000 | 0 | 19.35 | 27.25 | 27.25 | 23.84 | 23.84 | 18.57 | 43.80 |
| Tone Polyol-0221 | 26.48 | 0 | 0 | 0 | 0 | 0 | 0 | 0 |
| Uvinal N-539 | 0.74 | 0.74 | 0.73 | 0 | 0.73 | 0.73 | 0.73 | 0.73 |
| Tinuvin 328 | 0 | 0 | 0 | 0.73 | 0 | 0 | 0 | 0 |
| Tinuvin 770 | 0.34 | 0.34 | 0.35 | 0.73 | 0.34 | 0.34 | 0.34 | 0.34 |
| Wax E | 0.74 | 0.74 | 1.46 | 1.45 | 1.46 | 1.46 | 1.46 | 1.46 |
| Irganox 1010 | 0.05 | 0.05 | 0.10 | 0.10 | 0.10 | 0.10 | 0.10 | 0.10 |
| DBTDL | 0.05 | 0.05 | 0.05 | 0.05 | 0.05 | 0.05 | 0.05 | 0.05 |

*All amounts are expressed in parts by weight.

The twin screw extruder was a 34 mm diameter, counter-rotating twin screw extruder made by Leistritz GmBH of Nurenberg, West Germany. This particular apparatus had a length to diameter ratio of 35. The extruder had ten 120 mm zones which were configured as follows:

| Zone | Screw Pitch |
|---|---|
| Feed | 12 mm transitioning to 6 mm single start helix |
| 1 | 6 mm single start helix |
| 2 | 6 mm single start helix |
| 3 | 6 mm single start helix |
| 4 | 6 mm single start helix |
| 5 | 6 mm single start helix |
| 6 | 6 mm single start helix |
| 7 | first 90 mm - 6 mm single start helix, last 30 mm - 30 mm triple start helix |
| 8 | 30 mm triple start helix |
| 9 | first 30 mm - 30 mm triple start helix, last 90 mm - 6 mm single start helix |

The twin screw extruder also had a heated end block, i.e., "connecting zone".

For each sample, appropriate amounts of the 1,4-cyclohexane diisocyanate oligomer and Desmodur W diisocyanate were pre-mixed in a first storage tank. The contents of the first storage tank were blanketed with nitrogen gas, and a mechanical stirrer was used to keep the mixture in a homogeneous state. The contents of the first storage tank were also maintained at a temperature of from about 50° C. to about 70° C. in order to maintain the diisocyanates in a fluid, pumpable state.

Polydiol, chain extender, ultraviolet light absorber, hindered amine light stabilizer, lubricant, and antioxidant were pre-mixed in a second storage tank. The contents of the second storage tank were blanketed with nitrogen gas and continuously stirred with a mechanical stirrer. The contents of the second storage tank were also maintained at a temperature of from 90° C. to 110° C. to maintain the mixture in a fluid, pumpable state.

Two separated gear pumps were used to pump the contents of the first and second storage tanks to the twin screw extruder feed block. Right before the mixtures were pumped to the feed block, dibutyltin dilaurate catalyst was added to the mixture in the second storage tank. The gear pumps were carefully adjusted to control the flow rate of the two mixtures so that the molar ratio of the diisocyanates in the first storage tank to the diols, i.e., the polydiol and the chain extender, in the second storage tank was about 1.00±0.05. Temperatures of the extrusion zones were adjusted to obtain a complete reaction as well as a sufficient extrusion output. Typically, the extruder temperature was maintained at a temperature of from about 180° C. to about 220° C. Counter-rotating twin screws were used for the reaction to obtain good mixing during the polyurethane reaction. The screw speed was maintained at about 75 to about 85 rpm. A die pump was adapted to the end of the extruder last zone to help control the extruder pressure and to discharge the polyurethane at a consistent output rate. The die pump was set at a speed of from about 13 to about 15 rpm.

The polyurethane extrudate from the twin screw extruder was made in both pellet form and film form. For pellets, the polyurethane extrudate emerging from the extruder was transferred to a water bath for cooling. After cooling, the polyurethane was pelletized using a pelletizer. The resulting pellets were then dried in a forced air oven at a temperature of from about 80° C. to about 110° C. for a time period of from about 2 to 4 hours. The dried pellets were further processed into films of various thicknesses using a single screw extruder. A conventional single screw extruder, with an extruder screw diameter of 1.25 inch, a barrel length/diameter ratio of 24/1, and an extruder compression ratio of 3/1, was used. The extrusion reaction temperature was maintained at a temperature of about 170° C. to about 220° C. Molten polyurethane was extruded in film form onto a polyester film or a single coated silicone release paper.

To obtain a film form extrudate from the twin screw extruder, an extruder die was adapted to the die pump. The die was configured to produce polyurethane films having thicknesses of from about 0.15 to about 0.60 mm. The molten polyurethane was extruded onto a single coated silicone release paper on a chilled (20° C.) roll and then transferred to a winding roll.

EXAMPLE 3

The polyurethane samples prepared in Example 2 were characterized by measuring the number average molecular weight, M<n>, and the weight average molecular weight, M<w>, for each sample. For this characterization, the aliphatic polyurethane samples were dissolved in dimethyl acetamide solvent. Each solution had a concentration of polyurethane of about 0.5 percent by weight. After dissolving, each sample was injected into the column of a gel permeation chromatograph using dimethylacetamide as eluent. M<n> and M<w> for each sample was determined by using standard test (GPC) method D-3593. The results are reported in the following table:

TABLE III

| | Sample | | | | | |
|---|---|---|---|---|---|---|
| | 8 | 9 | 10 | 11 | 12 | — |
| | | | Comparison Sample | | | |
| | — | — | — | — | — | A |
| M<n> | 157,000 | 76,800 | 68,300 | 84,500 | 140,000 | 80,300 |
| M<w> | 318,000 | 140,500 | 124,300 | 157,700 | 277,000 | 151,500 |
| M<w>/M<n> | 2.02 | 1.83 | 1.82 | 1.87 | 1.98 | 1.89 |

EXAMPLE 4

Figure 5:
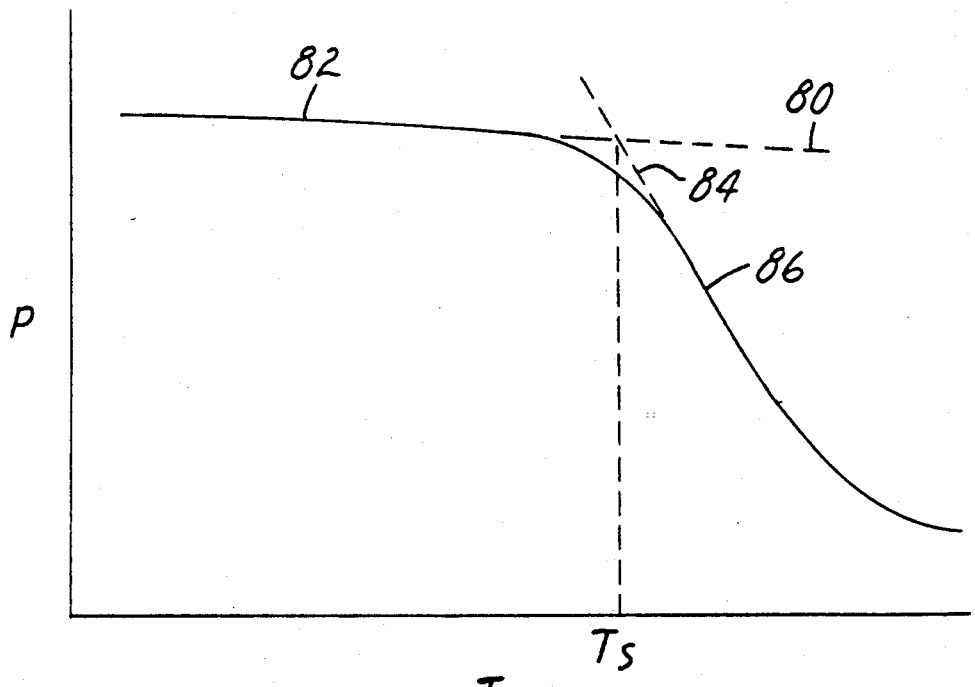
FIG. 5 illustrates how the softening temperature for a polymer sample is obtained from a graph of penetration versus temperature for that polymer sample.

The polyurethane samples prepared in Example 1 and Example 2 were characterized by measuring the softening temperature of each sample. For this characterization, polyurethane films having a thickness of from about 0.30 mm to about 0.35 mm were used. As shown in FIG. 5, the softening temperature was determined from a thermogram of penetration, P, versus temperature, T. For each sample, penetration as a function of temperature was measured using a Perkin-Elmer Model TMS-2 thermomechanical analyzer. The P versus T thermogram was measured using a penetration probe having a probe tip diameter of 0.102 cm and a loading weight of 5 grams. Temperature was increased at 20° C. per minute. The TMS-2 instrument used a linear variable differential transformer to convert the probe movement into a signal. The initial value of P was set at an arbitrary value. From the plot of P versus T, the softening temperature $T_s$ was determined as the intersection of the tangent 80 of the rubbery plateau 82 and the tangent 84 of the viscous flow region 86. The results are reported in the following table:

TABLE IV

| Sample | Softening Temperature (°C.) |
|---|---|
| 1 | 117 |
| 2 | 132 |
| 3 | 113 |
| 4 | 129 |
| 5 | 165 |
| 6 | 138 |
| 7 | 153 |
| 8 | 117 |
| 9 | 115 |
| 10 | 127 |
| 11 | 122 |
| 12 | 136 |
| A | 107 |

These results show that the polymers of the present invention have better thermal properties than the comparison sample.

EXAMPLE 5

The polyurethane samples prepared in Example 2 were characterized by measuring the tensile strength, the elongation percent, and the tensile modulus at 5% elongation. For this characterization, the physical properties of the samples were measured by using an Instron tensile stress and strain tester. The samples were polyurethane extruded films having a thickness of from about 0.30 mm to about 0.35 mm. Sample preparation and tensile strength and strain calculations were performed according to the methods described in ASTM D-638. The results are reported in the following table:

TABLE V

| Sample | Tensile Strength (psi) | Elongation (%) |
| --- | --- | --- |
| 6 | 11,000 | 490 |
| 7 | 7,800 | 480 |
| 8 | 11,100 | 450 |
| 9 | 9,300 | 450 |
| 10 | 9,100 | 450 |
| 11 | 11,600 | 500 |
| 12 | 9,700 | 570 |
| A | 10,300 | 450 |

EXAMPLE 6

The polyurethane samples prepared in Example 2 were characterized by measuring the Shore (A) hardness of each sample. The samples had thicknesses of from about 6 mm to about 10 mm and were prepared by pressing each sample in a heat hydraulic press at temperature of from about 170° C. to about 220° C. The hardness measurements were made according to ASTM D-2240 using a Durometer type A made by the Shore Instrument and Manufacturing Co., Freeport, N.Y. The results are reported in the following table:

TABLE VI

| Sample | Shore (A) hardness | weight percent Polydiol |
| --- | --- | --- |
| 6 | 67 | 60 |
| 7 | 80 | 55 |
| 8 | 92 | 42 |
| 9 | 91 | 42 |
| 10 | 87 | 45 |
| 11 | 82 | 48 |
| 12 | 88 | 48 |
| A | 88 | 44 |

These results show that the hardness of the polyurethanes generally depends upon the weight percent of polydiol in the polymer. Polyurethanes prepared with a greater weight percent of polydiol generally have a lower Shore (A) hardness value than polyurethanes prepared with lesser amounts of polydiol.

EXAMPLE 7

The polyurethane samples prepared in Example 2 were characterized by measuring the light transmission of each sample. For this characterization, each sample was a polyurethane film having a thickness of from about 0.30 mm to about 0.45 mm. Light transmission measurements were made with an IBM Model 9420 UV-Visible Spectrophotometer. The light transmission of each sample was measured in visible wavelength (400-900 nm). Results of the light transmission are reported in the following table:

TABLE VII

LIGHT TRANSMISSION VALUES

| | Sample | | | | | | Comparison Sample |
| --- | --- | --- | --- | --- | --- | --- | --- |
| | 6 | 7 | 8 | 9 | 10 | 11 | 12 | A |
| Film Thickness (mm) | 0.42 | 0.42 | 0.32 | 0.43 | 0.42 | 0.33 | 0.37 | 0.43 |
| 900 nm | 88.60 | 89.80 | 95.80 | 94.20 | 93.90 | 92.70 | 95.50 | 92.60 |
| 860 nm | 90.00 | 91.40 | 96.20 | 95.50 | 95.40 | 93.00 | 96.50 | 93.30 |
| 820 nm | 88.20 | 89.60 | 94.80 | 94.70 | 94.40 | 92.00 | 95.30 | 92.10 |
| 780 nm | 87.80 | 89.20 | 94.70 | 94.40 | 94.30 | 92.00 | 95.10 | 91.90 |
| 740 nm | 87.20 | 88.70 | 94.60 | 94.30 | 94.10 | 92.00 | 95.00 | 91.80 |
| 700 nm | 86.40 | 88.10 | 94.40 | 94.30 | 93.90 | 92.00 | 94.80 | 91.80 |
| 660 nm | 85.60 | 87.40 | 94.20 | 94.20 | 93.70 | 91.90 | 94.60 | 91.70 |
| 620 nm | 85.70 | 87.80 | 94.70 | 94.50 | 94.30 | 92.30 | 95.00 | 92.40 |
| 580 nm | 83.90 | 86.30 | 93.80 | 93.70 | 93.20 | 91.40 | 94.00 | 91.60 |
| 540 nm | 82.60 | 85.50 | 93.50 | 93.30 | 92.60 | 91.10 | 93.60 | 91.40 |
| 500 nm | 81.20 | 84.50 | 92.60 | 92.50 | 91.60 | 90.00 | 92.70 | 90.70 |
| 460 nm | 79.10 | 82.90 | 92.10 | 92.00 | 90.60 | 89.20 | 91.80 | 90.10 |
| 420 nm | 76.00 | 80.30 | 90.70 | 90.20 | 89.30 | 87.40 | 90.20 | 89.00 |

EXAMPLE 8

Polyurethane samples (Samples 8, 9, 10, 11, and 12, and Comparative Sample A) prepared in Example 2 were used to make cube-corner, retroreflective articles. Polyurethane films having a thickness of from about 0.30 mm to about 0.45 mm were used. Each sample was placed onto the top of a nickel electroform. The electroform carrying the sample was then placed between two chrome plates. A polyester film (2 mils thick) was positioned between the polyurethane sample and the top chrome plate to prevent the polyurethane from sticking to the chrome plate. Two sheets of cardboard were placed on the top and the bottom of the chrome plates to help prevent the chrome plates and the electroform from bending. The whole stack was then placed between the hot plates of a heat hydraulic press to emboss the polyurethane sample. The press was operated for 10 minutes at an embossing temperature of about 350° F. and a pressure of 200 psi (1.4 MPa) to 1000 psi (7 MPa). After cooling down the press, the embossed, cube-corner, retroreflective sample was removed from the electroform.

The cube-corner retroreflective samples were characterized by measuring the retroreflective brightness for samples aged at room temperature, 160° F. (71° C.), and 180° F. (82° C.), respectively. A retroluminometer, such as the Model 930 Photometer sold by advanced Retro Technology, Incorporated, was used to make the measurements. A standard retroreflective plate was used to calibrate the instrument before each measurement. Retroreflective measurements were measured in units of candelas per lux per square meter, $(cd/lux)/m^2$.

To prepare the samples for the measurements, each sample was cut to a size of about 3 inches (7.6 cm) by about 3 inches (7.6 cm) and placed on an aluminum plate such that the apex of the cube-corner elements were in contact with the aluminum plate. Areas of each sample were marked to assure that the same areas would be measured throughout the tests. The angles used to make the measurements were a −4 degree entrance angle and a 0.2 degree observation angle.

The samples were divided into three groups. One group was aged at room temperature, one group was aged at 160° F. (71° C.), and one group was aged at 180° F. (82° C.). For the latter two groups, aging took place in a common air recirculating oven (Model V-29 Despatch oven). Retroreflective measurements were made after time intervals of 0, 1, 5, 10, 15, 20, 25, and 28 days. To make each measurement, a sample was removed from the oven, as appropriate, and cooled to room temperature before the retroreflective measurement was made. After making the measurement, the sample was immediately returned to the oven for further aging. Each measurement took about 30 minutes.

Figure 6:
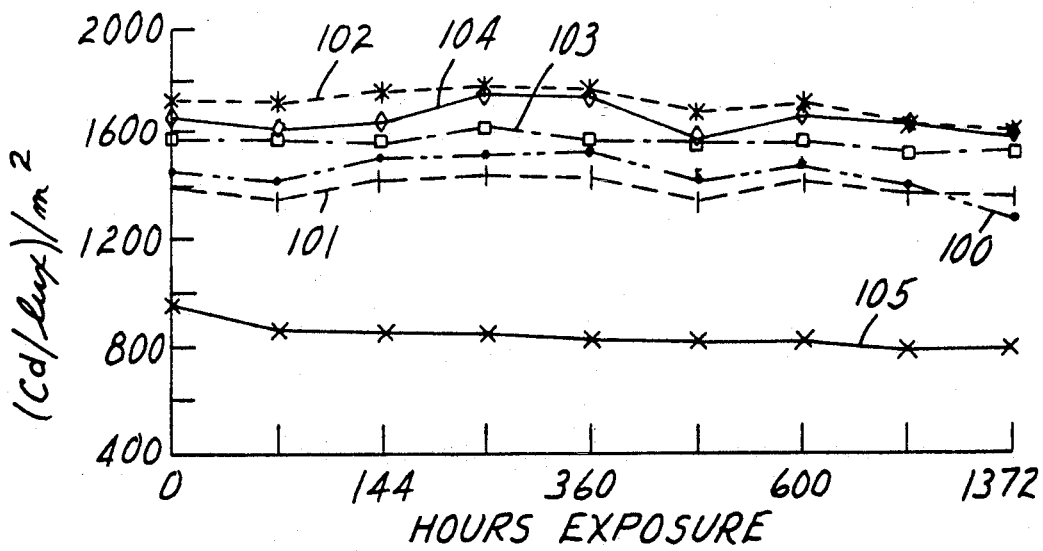
FIG. 6 is a graph showing the significant improvement in retroreflective brightness achieved by the present invention.
Figure 7:
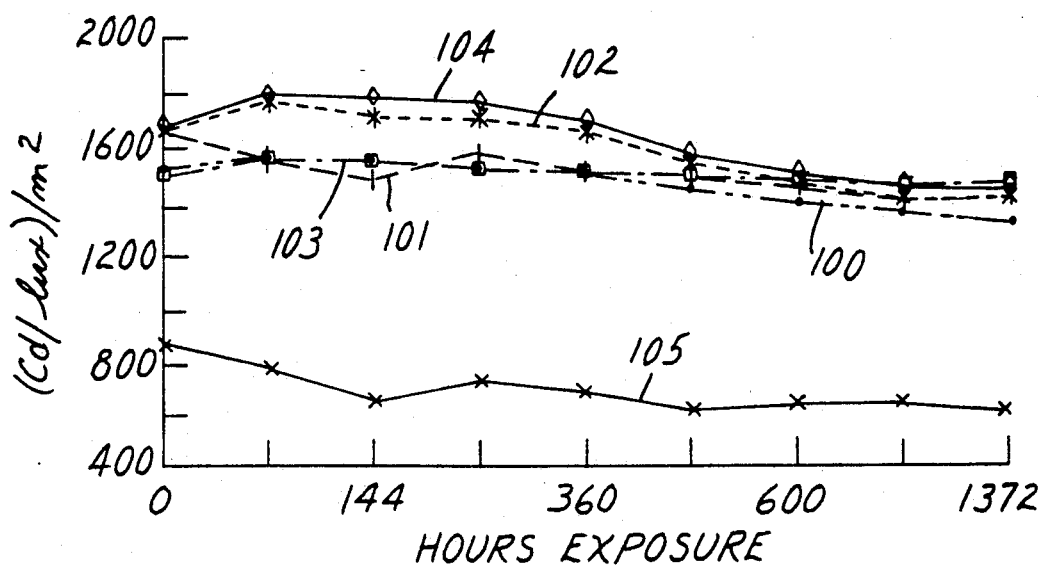
FIG. 7 is a graph showing the significant improvement in retroreflective brightness achieved by the present invention.
Figure 8:
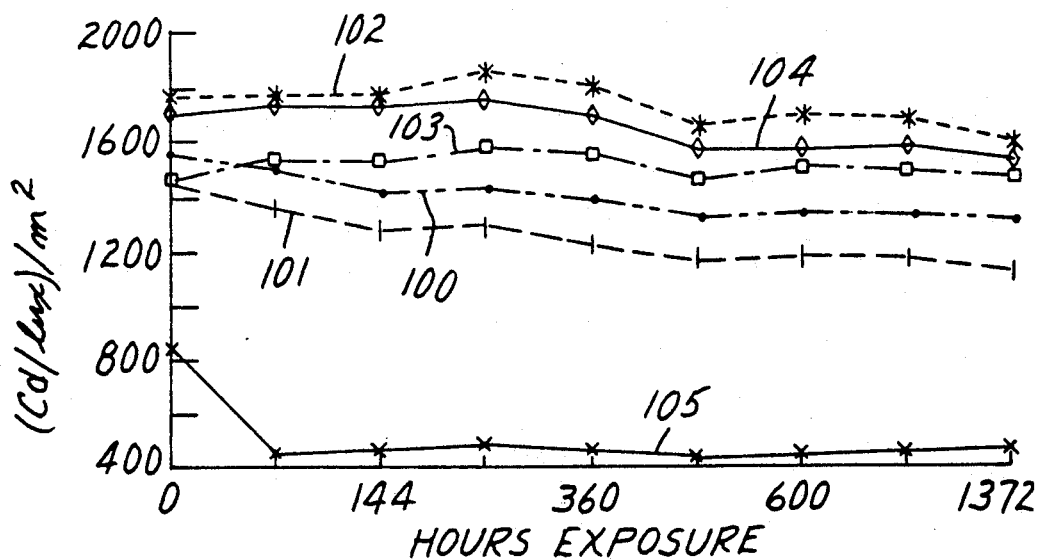
FIG. 8 is a graph showing the significant improvement in retroreflective brightness achieved by the present invention.

The results for ambient temperature, 160° F. (71° C.), and 180° F. (82° C.) are shown in FIGS. 6, 7, and 8, respectively. In FIGS. 6, 7, and 8, curves 100, 101, 102, 103, 104, and 105 correspond to Samples 8, 9, 10, 11, and 12 and Comparison Sample A, respectively. These results show that the retroreflective articles of the present invention (Samples 8, 9, 10, 11, and 12) have better initial retroreflective brightness than Comparison Sample A. For example, Samples 8, 9, 10, 11, and 12 had initial retroreflective brightness values of about 1500 cd/lux/m$^2$ or more. In contrast, Comparison Sample A had an initial retroreflective brightness value of only about 1000 cd/lux/m$^2$ or less.

Additionally, the retroreflective articles of the invention showed better retained retroreflective brightness than Comparison Sample A. At room temperature, Samples 8, 9, 10, 11, and 12 showed a retained retroreflective brightness of 98%, 100%, 94%, 95%, and 98%, respectively after 28 days of aging. In contrast, Comparative Sample A showed a retained retroreflective brightness of only 83% after 28 days of aging at room temperature.

At 160° F. (71° C.), Samples 8, 9, 10, 11, and 12 showed a retained retroreflective brightness of 91%, 86%, 84%, 98%, and 87%, respectively, after 28 days of thermal aging. In contrast, Comparison Sample A showed only 76% retained retroreflective brightness after 28 days of thermal aging at 71° C.

At 180° F. (82° C.), Samples 8, 9, 10, 11, and 12 showed a retained retroreflective brightness of 86%, 83%, 96%, 102%, and 93% after 28 days of thermal aging. In contrast, Comparison Sample A showed only 55% retained retroreflective brightness after 28 days of thermal aging at 82° C.

Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit of the invention which is indicated by the following claims.

We claim:

1. A flexible, retroreflective article, comprising a land and an array of retroreflective elements on the land, wherein the retroreflective elements comprise an optically clear, flexible, aliphatic polyurethane polymer wherein the aliphatic polyurethane polymer comprises a first plurality of hard chain segments having the formula

which are incorporated into the polyurethane polymer.

2. The retroreflective article of claim 1, wherein the retroreflective elements and the land are an integral body.

3. The retroreflective article of claim 1, wherein the retroreflective elements are cube-corner retroreflective elements.

4. The retroreflective article of claim 1, wherein the aliphatic polyurethane polymer comprises from about 2 to about 20 percent by weight of the first plurality of hard chain segments.

5. The retroreflective article of claim 1, wherein the aliphatic polyurethane polymer further comprises a plurality of soft chain segments having the formula —ORO—, wherein R is a divalent, aliphatic moiety, and wherein the soft chain segments have a molecular weight of from about 400 to about 5000.

6. The retroreflective article of claim 5, wherein the aliphatic polyurethane polymer comprises from about 30 weight percent to about 90 weight percent of the soft chain segments.

7. The retroreflective article of claim 5, wherein the soft chain segments are derived from a polydiol selected from the group consisting of polyester diols, polycaprolactone diols, polycarbonate diols, polydimethylsiloxane diols, polyether diols, polyolefin diols, and mixtures thereof.

8. The retroreflective article of claim 5, wherein the soft chain segments are derived from a polydiol selected from the group consisting of a hydroxy-terminated polycaprolactone diol, a hydroxy-terminated poly(tetramethylene oxide) diol, and mixtures thereof.

9. The retroreflective article of claim 5, wherein the aliphatic polyurethane polymer further comprises a second plurality of hard chain segments having the formula

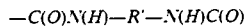

wherein R' is a divalent aliphatic moiety, said second plurality of hard chain segments being incorporated into the polyurethane polymer in an amount such that the ratio of the number of moles of the first plurality of hard chain segments to the total number of moles of the first and second plurality of hard chain segments is from about 0.05 to about 1.0.

10. The retroreflective article of claim 9, wherein the ratio of the number of moles of the first plurality of hard chain segments to the total number of moles of the first and second plurality of hard chain segments is from about 0.05 to about 0.40.

11. The retroreflective article of claim 9, wherein the second plurality of hard chain segments are derived from methylene bis-(4-cyclohexyl-isocyanate).

12. The retroreflective article of claim 9, wherein the aliphatic polyurethane polymer further comprises a plurality of chain extender segments incorporated into the polyurethane polymer in an amount such that the ratio of the total number of moles of the first and second plurality of hard chain segments to the total number of moles of the soft chain segments and the chain extender segments is about 1.0+/−0.05.

13. The retroreflective article of claim 12, wherein the chain extender segments have the formula

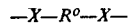

wherein the chain extender segments have a molecular weight of about 400 or less, wherein R$^o$ is a divalent aliphatic moiety, and wherein X is selected from the group consisting of oxygen, sulfur, NH, C(O)O, and mixtures thereof.

14. The retroreflective article of claim 12, wherein the chain extender segments are derived from a compound having a molecular weight of less than about 400 and are selected from the group consisting of diamines, diols, and mixtures thereof.

15. The retroreflective article of claim 12, wherein the chain extender segments are derived from 1,4-butane diol.

16. The retroreflective article of claim 1, wherein the aliphatic polyurethane polymer further comprises a second plurality of hard chain segments having the formula $$-C(O)N(H)-R'-N(H)C(O)-$$

wherein R' is a divalent aliphatic moiety, said second plurality of hard chain segments being incorporated into the polyurethane polymer in an amount such that the ratio of the number of moles of the first plurality of hard chain segments to the total number of moles of the first and second plurality of hard chain segments is from about 0.05 to about 1.0.

17. The retroreflective article of claim 16, wherein the ratio of the number of moles of the first plurality of hard claim segments to the total number of moles of the first and second plurality of hard chain segments is from about 0.10 to about 0.40.

18. The retroreflective article of claim 16, wherein the second plurality of hard chain segments are derived from methylene bis-(4-cyclohexyl-isocyanate).

19. The retroreflective article of claim 1, wherein the aliphatic polyurethane polymer further comprises a plurality of chain extender segments incorporated into the polyurethane polymer.

20. The retroreflective article of claim 19, wherein the chain extender segments have the formula $$-X-R^o-X-.$$

wherein the chain extender segments have a molecular weight of about 400 or less, wherein $R^o$ is a divalent aliphatic moiety, and wherein X is selected from the group consisting of oxygen, sulfur, NH, C(O)O, and mixtures thereof.

21. The retroreflective article of claim 19, wherein the chain extender segments are derived from a compound having a molecular weight of less than about 400 and are selected from the group consisting of diamines, diols, and mixtures thereof.

22. The retroreflective article of claim 19, wherein the chain extender segments are derived from 1,4-butane diol.

23. The retroreflective article of claim 1, wherein the aliphatic polyurethane polymer has a number average molecular weight of at least about 60,000.

24. The retroreflective article of claim 1, wherein the aliphatic polyurethane polymer has a weight average molecular weight of at least about 100,000.

25. The retroreflective article of claim 1, further comprising a backing layer applied to the apices of the retroreflective elements.

26. The retroreflective article of claim 1, further comprising a protective top layer applied to the lower surface of the land.

27. A flexible, retroreflective article, comprising a land and an array of retroreflective elements on the land, wherein the retroreflective elements comprise an optically clear, flexible aliphatic polyurethane polymer having a softening temperature of at least 110° C.

* * * * *

UNITED STATES PATENT AND TRADEMARK OFFICE
CERTIFICATE OF CORRECTION

PATENT NO. : 5,117,304
DATED : May 26, 1992
INVENTOR(S) : Huang et al.

It is certified that error appears in the above-identified patent and that said Letters Patent is hereby corrected as shown below:

Title page, [75] Inventors: "Mirian" should be --Miriam--.

IN THE DRAWINGS:
Sheet 1 of 3, Fig. 4, the reference numeral "43" on the right edge of the drawing should be --44--.

Col. 4, line 29, "I' Perfect" should be --I'. Perfect--.

Col. 19, line 17, "claim" should be --chain--.

Signed and Sealed this

Twenty-eighth Day of September, 1993

Attest:

BRUCE LEHMAN

Attesting Officer     Commissioner of Patents and Trademarks